United States Patent
Bowles

[11] Patent Number: 5,427,263
[45] Date of Patent: Jun. 27, 1995

[54] FUEL TANK ASSEMBLY

[75] Inventor: David T. Bowles, Chelmsford, England

[73] Assignee: Ford Motor Company, Dearborn, Mich.

[21] Appl. No.: 172,953

[22] Filed: Dec. 27, 1993

[30] Foreign Application Priority Data

Dec. 31, 1992 [GB] United Kingdom ............... 92/27159

[51] Int. Cl.⁶ .............................................. B65D 25/20
[52] U.S. Cl. ..................... 220/86.2; 285/21; 285/158; 285/192; 285/319; 285/921
[58] Field of Search ............... 285/158, 192, 921, 319, 285/21; 141/285; 220/86.2

[56] References Cited

U.S. PATENT DOCUMENTS

| | | |
|---|---|---|
| 2,517,717 | 8/1950 | Rose ..................................... 285/192 |
| 2,779,498 | 1/1957 | Cole et al. ........................ 285/158 X |
| 3,405,958 | 10/1968 | Holdren ........................... 285/192 X |
| 4,335,905 | 6/1982 | Bol ................................... 285/158 X |
| 4,404,983 | 9/1983 | Scheurenbrond et al. ..... 285/158 X |
| 4,462,620 | 7/1984 | Bambenek et al. . |
| 5,129,684 | 7/1992 | Lawrence et al. .............. 285/192 X |

FOREIGN PATENT DOCUMENTS 438379  11/1935  United Kingdom .

Primary Examiner—Dave W. Arola
Attorney, Agent, or Firm—David B. Kelley; Roger L. May

[57] ABSTRACT

A sealing connection between a fuel tank wall and a filler pipe is achieved by a sealing and retaining collar. The collar has a seal and a retention clip arrangement which prevents the pipe being accidentally being pulled out of the tank.

10 Claims, 1 Drawing Sheet

FUEL TANK ASSEMBLY

FIELD OF THE INVENTION

This invention relates to a fuel tank assembly for a motor vehicle.

BACKGROUND OF THE INVENTION

It is conventional for a fuel tank and the filler pipe through which the tank will be filled to be manufactured separately and to be connected to one another during assembly of the motor vehicle. The connection of the pipe to the tank should therefore be easy to make, yet should satisfactorily seal and should also be resistant to separation forces.

It is known to provide an annular sealing grommet at the tank inlet opening and to push-fit the end of a round pipe through the grommet to form a seal. It is conventional to machine the end of the filler pipe to produce a true cylindrical wall which will seal with the grommet. However such an assembly has very little resistance to separation loads, although it is intended that some sliding movement between the filler pipe and the grommet should be allowed without adversely affecting the performance of the seal.

SUMMARY OF THE INVENTION

According to the present invention there is provided a fuel tank assembly for a motor vehicle, the assembly comprising a tank with an inlet opening, a filler pipe, and a sealing and retaining collar for connecting the filler pipe to the tank, the collar being sealed to the tank wall around the inlet opening and having an annular seal and a retaining portion axially spaced from the seal, wherein the filler pipe has an end region which fits within and seals with the collar seal, and a locking rib which engages with the collar retaining portion.

The fuel tank is preferably molded from a plastic material as is the sealing and retaining collar. The two can be connected together by a conventional welding technique, such as hot plate welding, which can connect a flange of the collar to a surface of the tank. The annular seal can be a rubber grommet supported on an annular shoulder in the collar.

The retaining portion is preferably arranged so that the locking rib on the filler pipe can be snap-fit into the retaining portion which therefore has some degree of resilience. For example the retaining portion may be a cuff with at least one split around its circumference to allow yielding as the rib on the filler pipe passes through. The cuff may be connected to the annular seal by generally axially extending legs and may also include an external groove in which a conventional hose clamp can be received to secure the engagement between the retaining portion and the locking rib. The filler pipe may have an external annular groove, one face of which will form the locking rib.

The invention also provides a sealing and retaining collar for use in connecting a fuel tank filler pipe to the tank, the collar comprising an annular seal and a retaining portion axially spaced from the seal, the seal and the retaining portion being adapted to, respectively, seal and retain a filler pipe in the collar, the collar furthermore including means by which it can be secured to the wall of a fuel tank.

DETAILED DESCRIPTION OF THE PREFERRED EMBODIMENTS

Figure 1:
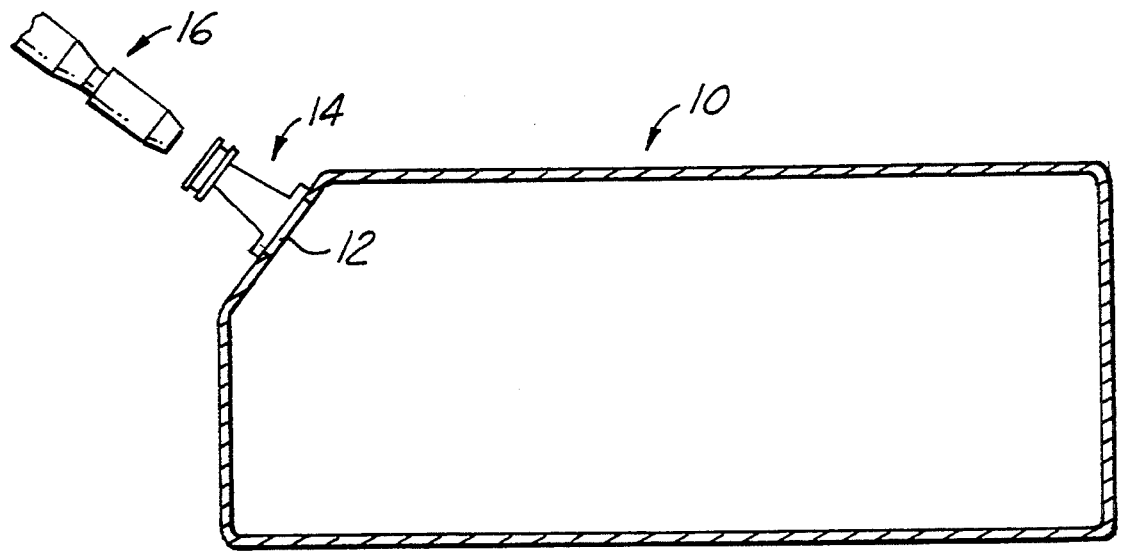
FIG. 1 is a schematic cross-section through a fuel tank assembly in accordance with the present invention prior to connection of the filler pipe to the tank.

FIG. 1 shows a fuel tank 10 which is molded from high density polyethylene and which has an inlet opening 12. The tank will have other openings through its wall and other components associated with it, but such components are not relative to the present invention and are not shown in the drawing.

A filler pipe sealing and retaining collar 14 is mounted on the external wall of tank 10 around inlet opening 12, and a fuel tank filler pipe 16 is to be connected to tank 10 for the purposes of re-filling the tank. Only one end of pipe 16, the fuel tank end, is shown in FIG. 1. The other end (not shown) will be accessible from the exterior of the vehicle so that a filler nozzle can be inserted, and that end of the pipe will be sealably closed by a filler cap (not shown).

Figure 2:
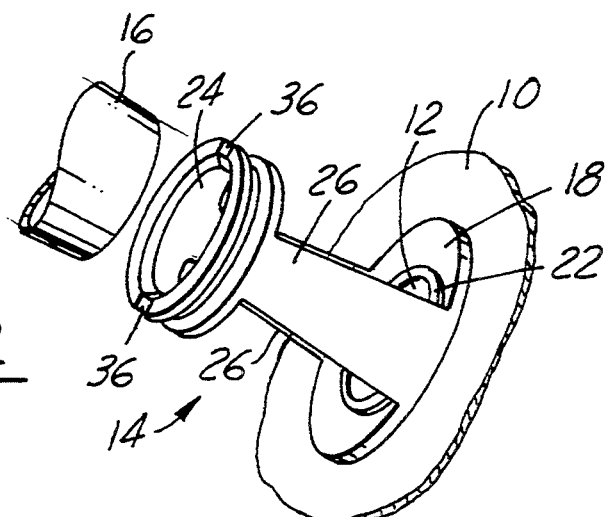
FIG. 2 is a perspective view on a larger scale of a sealing and retaining collar in accordance with the present invention.
Figure 3:
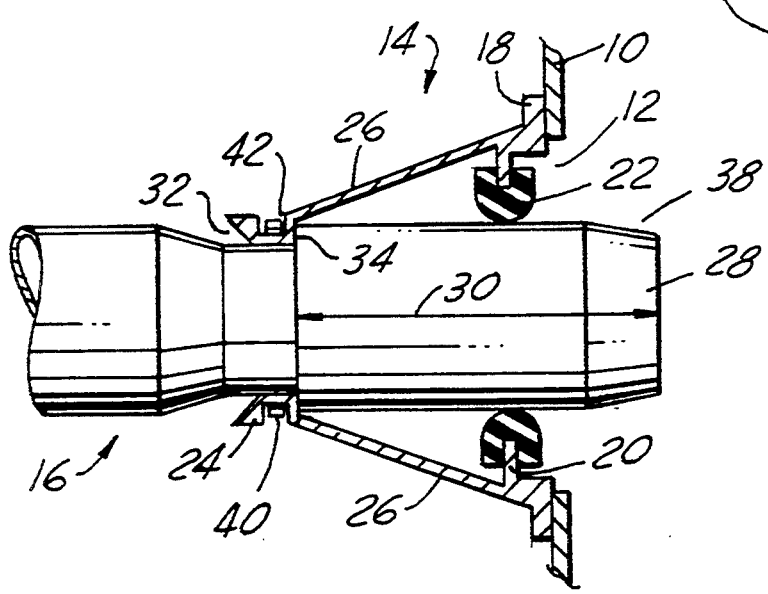
FIG. 3 shows a cross-section through the assembled components.

FIGS. 2 and 3 show collar 14 in more detail. Collar 14, which preferably is molded of a plastic material, has annular flange 18 which can be attached, for example by hot plate welding, to tank 10 around opening 12. Radially inside flange 18 is annular shoulder 20 on which rubber grommet 22 is supported. Retaining cuff 24 is connected to flange 18 by two legs 26, and has at least one split, and preferably two split points 36a, on an outer circumference thereby forming cuff halves 36 (FIG. 2).

Filler pipe 16, which is to be connected to tank 10 by means of collar 14, is preferably made by blow-molding and is formed with an annular groove 32 which ends in a lip 34. Free end 28 of pipe 16 is machined over a length 30, which is the distance from 34 to end 28 to form a true cylindrical surface to seal with grommet 22. Portions 38 near end 28 are tapered radially toward an axis through the center of pipe 16 and perpendicular to end 28 near opening 12.

In use, flange 18 of collar 14 is welded to tank 10 as previously described. Pipe 16 is then pushed into collar 14. Tapered portions 38 of end 28 spread aside cuff halves 36 so that length 30 of pipe 16 can pass through cuff 24 and into sealing contact with grommet 22. When lip 34 has passed cuff 24, cup halves 36 will snap back into place to the position shown in FIG. 3 to retain pipe 16 against pull-out loads. As added security, hose clamp 40 can be positioned in groove 42 of cuff 24.

The arrangement thus described allows simple assembly of filler pipe 16 to tank 10, and provides good retention of pipe 26 to tank 10, even during high pull-out loads. The connection between pipe 16 and tank 10 can, however, be easily disassembled for maintenance purposes.

I claim:

1. A fuel tank assembly for a motor vehicle, the assembly comprising:
   a fuel tank with an inlet opening;
   a filler pipe; and a sealing and retaining collar for connecting said filler pipe to said fuel tank, said collar being sealed to said tank around said inlet opening and having an annular seal and a retaining portion axially spaced from said seal comprising a cuff with at least one circumferential split, and wherein said filler pipe has an end region which fits within and seals with said collar seal, and a locking rib which snap-fits into said retaining portion.

2. A fuel tank assembly as claimed in claim 1, wherein fuel tank is blow molded from a plastic material, and wherein said sealing and retaining collar is formed from a plastic material.

3. A fuel tank assembly as claimed in claim 2, wherein said tank and said collar are connected together by hot plate welding.

4. A fuel tank assembly as claimed in claim 1 wherein said annular seal is a rubber grommet supported on an annular shoulder in said collar.

5. A fuel tank assembly as claimed in claim 1, wherein said cuff is connected to said annular seal by generally axially extending legs.

6. A fuel tank assembly as claimed in claim 5, wherein said cuff includes an external groove in which a conventional hose clamp can be received.

7. A fuel tank assembly as claimed in claim 1, wherein said filler pipe has an external annular groove, one face of which forms said locking rib.

8. A fuel tank assembly for a motor vehicle, the assembly comprising:
a fuel tank with an inlet opening;
a filler pipe having an end region with an annular locking rib thereon; and
a collar sealingly connected to said fuel tank around said inlet opening and connected to the filler pipe adjacent the inlet opening for retaining the filler pipe to the fuel tank, the collar having:
(a) an annular seal for sealing between the end region and the collar, and
(b) a cuff axially spaced from the seal and having at least one circumferential split providing said connection to said filler pipe by a snap fit with the locking rib.

9. A fuel tank assembly as claimed in claim 8, wherein the cuff is connected to the annular seal by generally axially extending legs.

10. A fuel tank assembly as claimed in claim 9, wherein the cuff includes an external groove in which a conventional hose clamp can be received.

* * * * *